(12) United States Patent
Leon et al.

(10) Patent No.: US 7,536,622 B2
(45) Date of Patent: May 19, 2009

(54) DATA REPAIR ENHANCEMENTS FOR MULTICAST/BROADCAST DATA DISTRIBUTION

(75) Inventors: David Leon, Irving, TX (US); Igor Danilo Diego Curcio, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/813,343

(22) Filed: Mar. 29, 2004

(65) Prior Publication Data

US 2005/0216812 A1   Sep. 29, 2005

(51) Int. Cl.
*H04L 1/18* (2006.01)
(52) U.S. Cl. .......................................... 714/748; 714/18
(58) Field of Classification Search ................. 714/748, 714/746, 18; 370/229
See application file for complete search history.

(56) References Cited

U.S. PATENT DOCUMENTS 6,031,818 A * 2/2000 Lo et al. ..................... 370/216
6,141,785 A * 10/2000 Hur et al. .................... 714/748
6,278,716 B1 * 8/2001 Rubenstein et al. ......... 370/432
6,501,763 B1 * 12/2002 Bhagavath et al. .......... 370/432
6,577,599 B1 * 6/2003 Gupta et al. ................ 370/236
6,693,907 B1 * 2/2004 Wesley et al. ............... 370/390

OTHER PUBLICATIONS

Cam et al. (Efficient ARQ schemes for point-to-multipoint communication, IEEE international conference on communications Jun. 23-26, 1991; on pp. 1627-1632 vol. 3).*
Lin et al. (RMTP: a reliable multicast transport protocol; INFOCOM '96. Fifteenth Annual joint conference of the IEEE computer societies. Networking the Next generation. Proceeding IEEE; Mar. 24-28, 1996, on pp. 1414-1424 vol. 3).*

* cited by examiner

*Primary Examiner*—Esaw T Abraham
(74) *Attorney, Agent, or Firm*—Foley & Lardner LLP

(57) ABSTRACT

A method, system, device, and computer code product is disclosed in which a sender transmits data to a plurality of receivers via a point-to-multipoint session. The receiver sends data repair requests to the sender requesting data expected but not received and the sender retransmits the expected but not received data via the point-to-multipoint session. The sender can also schedule point-to-point data repair sessions with individual receivers if the retransmission via the point-to-multipoint session does not correct all errors. The sender can be configured to delay point-to-point repair sessions using a randomization mechanism based on the number of receivers using the point-to-multipoint session.

20 Claims, 5 Drawing Sheets

DATA REPAIR ENHANCEMENTS FOR MULTICAST/BROADCAST DATA DISTRIBUTION

FIELD OF THE INVENTION

The invention generally relates to multicast and broadcast transmission technology and services, that is, services with at least one data source (or sender) and at least one receiver. More particularly, the invention relates to data repair enhancements in a multicast or broadcast transmission.

BACKGROUND OF THE INVENTION

For one-to-many (i.e., point-to-multipoint) services over systems such as IP multicast, IP datacasting (IPDC) and multimedia broadcast/multicast services (MBMS), file delivery (or discrete media delivery or file download) is an important service. Many of the features for delivering files over point-to-point protocols such as file transfer protocol (FTP) and hypertext transfer protocol (HTTP) are problematic for one-to-many scenarios. In particular, the reliable delivery of files—that is the guaranteed delivery of files—using similar one-to-one (i.e., point-to-point) acknowledgement (ACK) protocols such as transmission control protocol TCP is not feasible.

The Reliable Multicast Transport (RMT) Working Group of the Internet Engineering Task Force (IETF) is in the process of standardizing two categories of error-resilient multicast transport protocols. In the first category, reliability is implemented through the use of (proactive) forward error correction (FEC), that is, by sending a certain amount of redundant data that can help a receiver in reconstructing erroneous data. In the second category, receiver feedback is used in order to implement reliable multicast transport. Asynchronous Layered Coding (ALC, RFC 3450) is a protocol instantiation belonging to the first category, while the NACK-Oriented Reliable Multicast (NORM) protocol presents an example of the second category. The details of ALC and NORM protocols are discussed in more detail in publications entitled "*Asynchronous Layered Coding (ALC) Protocol Instantiation*" (*IETF RFC* 3450) and "*NACK-oriented Reliable Multicast Protocol*" (Internet Draft) prepared by the Working Group of the IETF. The contents of these publications are fully incorporated herein by reference.

Access networks on which these protocols can be used include, but are not limited to, wireless multiple-access networks such as radio access networks of the Universal Mobile Telecommunications Services (UMTS) system, wireless local area networks (WLAN), Digital Video Broadcasting-Terrestrial (DVB-T) networks Digital Video Broadcasting-Satellite (DVB-S) networks and Digital Video Broadcasting-Handheld (BDVB-H) networks.

Briefly, ALC protocol is a proactive FEC-based scheme that allows receivers to reconstruct mangled packets or packets that have not been received. ALC protocol uses FEC encoding on multiple channels, allowing the sender to send data at multiple rates (channels) to possibly heterogeneous receivers. Additionally, ALC protocol uses a congestion control mechanism to maintain different rates on different channels.

ALC protocol is massively scalable in terms of the number of users because no uplink signalling is required. Therefore, adding more receivers does not put increased demand on the system. However, ALC protocol is not 100% reliable because reception is not guaranteed, thus it may be generally described as robust, rather than reliable.

NORM, in turn, specifies the use of negative acknowledgement (NACK) messages in order to signal which packets of data (or otherwise defined "data blocks") that were expected to arrive at the receiver were not received at the receiver (or were received incorrectly). In other words, receivers employ NACK messages to indicate loss or damage of transmitted packets to the sender. Accordingly, a receiver that "missed" some data blocks from a data transmission can send a NACK message to the sender requesting the sender to re-transmit the missed data block or blocks. NORM protocol also optionally allows for the use of packet-level FEC encoding for proactive robust transmissions.

File Delivery over Unidirectional Transport (FLUTE) is a one-to-many transport protocol that builds on FEC (RFC 3452) and ALC building blocks. It is intended for file delivery from sender(s) to receiver(s) over unidirectional systems. It has specializations which make it suitable to wireless point-to-multipoint (multicast/broadcast) systems. The details of FLUTE protocol are discussed in more detail in the publication entitled "*FLUTE—File Delivery over Unidirectional Transport*" (Internet Draft) prepared by the above-mentioned Working Group of the IETF. The contents of this publication are fully incorporated herein by reference.

NACK messages are not generally NORM specific, but they can also be used in connection with other protocols or systems, such as FLUTE. An ACK is a response message a receiver sends after receiving one or more data packets to acknowledge they were received correctly. A NACK is a response a receiver sends to the sender about packets that were expected to arrive, but were not received.

When in multicast or broadcast environment, the data transmission occurs in a one-to-many fashion. If the transmission is not error free and different receivers are subject to different error rates (for example in MBMS users in different cells may experience different signal quality and, as a consequence, different error rate), there is the problem of providing increased data reliability. This can be achieved through the use of FEC and/or through the use of repair sessions.

FEC provides a certain amount of redundancy to the transmitted data, in order to allow a certain degree of error resilience to enable a receiver to reconstruct the transmitted data. However, one problem of FEC is that it usually does not provide error free error recovery, or it provides full error recovery at the cost of a high use of data redundancy, which increases the channel bandwidth requirements.

A repair session (between receiver and sender) can be employed to complement FEC (to reduce or eliminate the residual channel error rate), or can be used alone as the only method for error recovery. A repair session can occur over a point-to-point channel using a separate session. In this case, all the receivers that have missed some data during the multicast/broadcast transmission, send NACK requests to the sender to request the retransmission of the missing packets. However, if all the receivers miss at least one data packet, all the receivers will establish simultaneously point-to-point connections with the sender causing feedback implosion, i.e., congestion in the network (in uplink direction for the large number of NACKs and in downlink direction for the large number of concurrent re-transmission and network connection requests) and overload of the sender. This situation is critical when considering, for example, thousands of users, as may be the case in MBMS networks.

As such, there is a need for an improved device, system, and method for data repair that is scalable and provides efficient repair of messages in multicast and broadcast environments.

SUMMARY OF THE INVENTION

Various embodiments of systems, methods, devices and computer code products are disclosed according to the present invention. The various embodiments are capable of point-to-multipoint communications and can include transmitting data from a sender to a plurality of receivers via a point-to-multipoint session, determining if any expected data was not received, sending a data repair request to the sender if data is missing, and retransmitting the missing data via the point-to-multipoint session. The sender also can be configured for scheduling and performing point-to-point repair sessions if the point-to-multipoint retransmission does not correct the loss of data problem.

A randomization mechanism can be used to delay point-to-point data repair until after the sender retransmits data indicated as not received via the point-to-multipoint session. The randomization mechanism can be configured to take into account the number of receivers included in the plurality of receivers. Alternatively (or additionally), the sender can send a point-to-point repair token to the plurality of receivers to announce when point-to-point repair will begin.

DETAILED DESCRIPTION OF THE PREFERRED EMBODIMENTS

There are various methods and systems for repairing data in a multicast or broadcast system. U.S. patent application entitled "Data Repair" (Ser. No. 10/782,371) filed on Feb. 18, 2004, the contents of which are incorporated fully herein by reference, describes efficient methods for repairing data. This application proposes that after reception of a certain number of NACK requests from receivers, the sender may decide, based on its own decision strategies, to retransmit via point-to-multipoint part of the total number of packets that are NACKed by the receivers, for example, those packets that are most requested from the receivers. The sender may also close the point-to-point connections in order to save network resources.

One drawback with methods such as these is that retransmitting only the most NACKed packets may not lead to total error recovery in the case where there is little statistical correlation between the NACK requests of different users. For example, if a particular error situation is such that receiver #1 NACKs for packets 1, 2, and 3, and receiver #2 NACKs for packets 4, 5, and 6, and so on, the sender may not be able to derive what are the "most requested packets" and, as a consequence, the point-to-multipoint repair may lose its efficiency. The subject invention proposes improved methods, devices and systems for data repair.

Figure 1A:
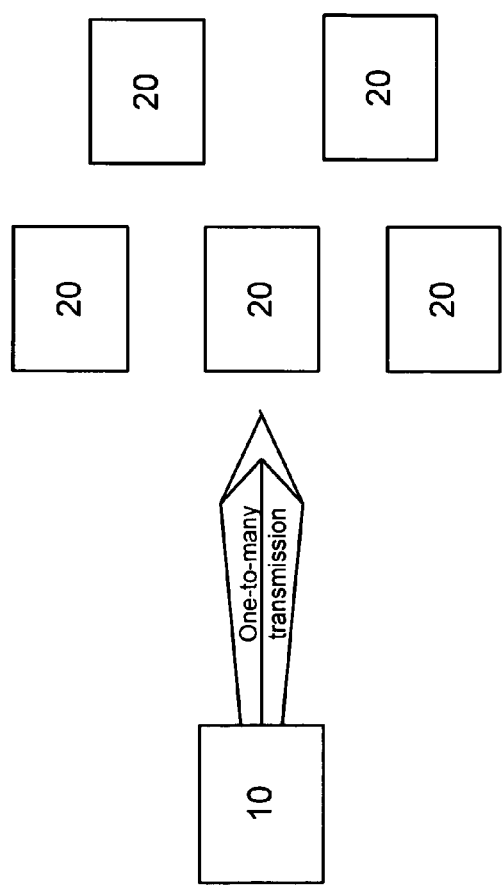
FIG. 1A is a block diagram illustrating a point-to-multipoint transmission scenario in accordance with one embodiment of the invention.

FIG. 1A shows a point-to-multipoint data transmission scenario in accordance with an embodiment of the invention. The sender device 10 can be a server, IP-based device, DVB device, GPRS (or UMTS) device or similar device that may use proactive forward error correction, such as an ALC mechanism and/or FEC mechanism, for sending multicast data blocks (or packets) to receiver devices 20 in a one-to-many fashion. Each receiving device 20 can be configured to send negative acknowledgement NACK messages (or requests) to the sender device 10 concerning missing blocks (blocks not received or received incorrectly).

Data can be transferred from sender 10 to receiver(s) 20 as objects. For instance, a file, a JPEG image, and a file slice are all objects. The objects can be sent as a series of data blocks. Each data block can have a number called a source block number (SBN) or similar identifier, which can be used to identify each block. Blocks can be represented by a set of encoding symbols. An encoding symbol identifier (ESI) or similar identifier, in turn, can indicate how the encoding symbols carried in the payload of a data packet (or block) were generated from the above-mentioned object (e.g., file).

Figure 1B:
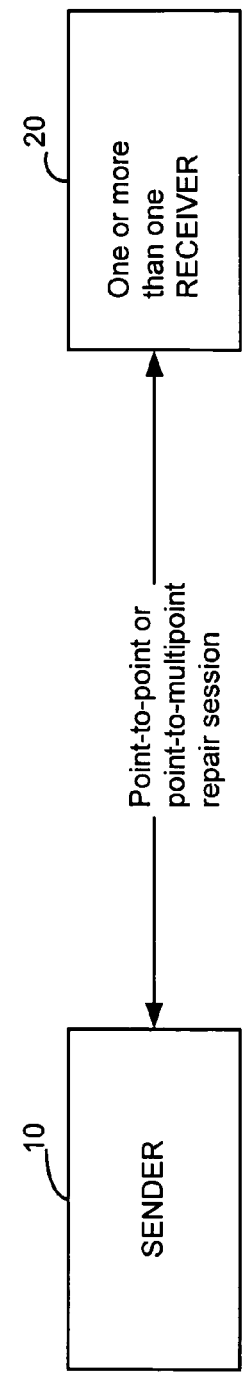
FIG. 1B is a block diagram illustrating different missing data repair methods in accordance with embodiments of the invention.

In a point-to-multipoint system, a sender 10 can broadcast data blocks or packets representing an object to many receivers 20 simultaneously. If a receiver 20 does not receive all of the packets that it expects, it can send a NACK message back to the server 10 indicating which packets were not received. FIG. 1B illustrates several different data repair methods in accordance with embodiments of the subject invention. In general, repair of missing data can be performed by using a point-to-point repair session established between one sender 10 and one receiver 20 or by using a point-to-multipoint session between the sender 10 and more than one receiver 20. In a repair session, missing data in total or in part (depending on the case) can be re-transmitted from the sender 10 to the receiver(s) 20 or the whole transmission can be repeated. Repair may be effected from the original sender 10 or from a "third party server" or repair server (or just simply a separate server (not shown)) which has a connection with the original server and is configured to buffer the transmission data/information. This server may, for example, be co-located with the original sender (e.g., an MBMS server, also called BM-SC (Broadcast Multicast-Service Center)), or, for example, be a separte server within an UMTS operator's network.

It has been observed that, in general, reliable multicast systems present the problem of requiring receiver-server control and data messaging which, due to the multiparty nature of multicast, presents scalability problems. There are several areas, in particular, which are of concern. For example:

a) limited radio bandwidth and activation resources, where the time it would take to activate many radio channels and the radio bandwidth makes it infeasible to allow many repairs to occur simultaneously;

b) limited server capacity, where the server system, which is providing the "repair content" data, can handle limited numbers of requests (messaging) and associated session context data within a certain time window and a limited amount of simultaneous data transfer sessions: and c) limited end-to-end bandwidth, due to one or more bottlenecks in the overall system. Here the data rate, which could be made available to all the users requiring repair simultaneously, is, in many cases, insufficient to provide this service.

Thus, one factor which may be used to increase scalability under any or all of these limitations can be to distribute the messaging in time, or avoid it entirely if possible. One embodiment of the subject invention concerns methods, devices, and systems which can enable NACK suppression to provide scalable reliable multicast.

One embodiment of the subject invention proposes that all packets that are requested by at least one receiver 20 be retransmitted by the server 10 on the point-to-multipoint bearer. In this embodiment, the receivers 20 can be configured to have both a point-to-point (ptp) bearer and point-to-multipoint (ptm) bearer setup at the same time. The ptp bearer can be used, for example, to service repair requests as described in U.S. patent application Ser. No. 10/782,371. One embodiment of the subject invention can use randomization rules similar to those described in the aforementioned patent application. However, the embodiment of the subject invention can retransmit the lost data on the downlink ptm bearer instead of using the downlink ptp bearer.

In this embodiment, receivers 20 whose turn to request has not come yet because of the random back-off value they computed, may have the opportunity to repair their own loss by receiving lost packets retransmitted through the ptm channel. If a receiver 20 receives a missing data packet through the ptm channel, it can reconstruct the file using this data and remove the missing data packet from its list of packets to request. It may be possible that a receiver 20 can receive all of its missing data before its computed request time, in which case it could refrain from making any repair requests at all.

In another embodiment of the subject invention, ptp repair can be offered by a sender 10 in conjunction with the above-described ptm repair mechanism. This may be useful, in particular, for sessions when not all of the receivers 20 are capable of having both a ptp and ptm bearer open at the same time. In this case, for greater efficiency, the sender 10 may specify a randomization mechanism so as to delay requests for ptp repair. This allows repair on the ptm bearer that may benefit a higher number of receiver 20 to be done first. One way to do so, for example, may be through the use of threshold values (such as X, Y, Z) sent by the sender 10 to the receivers 20. The receiver 20 could then be configured to schedule their repair requests. One sample rule for receivers 20 to schedule repair requests according to one embodiment of the present invention could be:

If ptm repair is possible, then
    uniformly randomize the NACK(s) over a time period X, starting from the end of the initial delivery session;
else
    wait until after a certain time Y after the initial session ends, and then randomize the NACK(s) over a time period Z.

The sender 10 could also explicitly signal when ptp repair should start. To this end, the sender can send a ptp repair token to the receivers 20 to announce when ptp repair can start (when ptp repair starts, the ptp repair session can be subject to the normal randomization rules.) Prior to sending the ptp repair token, all repairs are done on the ptm bearer. Receivers 20 that are not capable of having two concurrent bearers (e.g. ptp and ptm) can thus wait for the token before they setup their ptp repair bearer. The repair token can be transmitted using any communication protocol at any of the layers 1-7 of the ISO OSI protocol stack, including, for example, via SDP in a separate "announcement" after the multicast/broadcast transmission. This can also be included in a FLUTE file delivery within a multicast/broadcast transmission. A separate Transport Object Identifier (TOI) value can be used to distinguish between the file content itself and the ptp repair content. In one embodiment of the subject invention, a receiver 20 that has already used ptm repair may also use ptp repair. This can be useful if the ptm repair was not successful, i.e. the packet that was resent on the ptm bearer was lost.

While randomization can help prevent feedback implosion, it is preferable that back-off times be computed according to the number of receivers 20 in a system in order to increase efficiency. If the back-off times are chosen to small, the risk of feedback implosion may not be minimized, especially if there are a large number of receivers 20 in the session. If, on the other hand, the back-off times are too large, the risk of feedback implosion decreases but the scheme becomes inefficient if there are only a few receivers in the session since each receiver will be required to wait an unnecessarily large amount of time before being able to make a repair request.

If the sender 10 knows the number of receivers 20 in a session, the sender 10 may be able to scale its randomization values based on the number of receivers 20 to optimize the performance of the system. One such type of session is an MBMS multicast session, where the sender 10 is able to derive the number of receivers 20 as the latter need to signal the session join and leave procedures. In one embodiment, a linear relation between the number of receivers 20 in the session and the randomization values can be used to compute the necessary threshold values. For example, using the randomization method proposed in U.S. patent application Ser. No. 10/782,371;

If below the threshold error rate W then
    uniformly randomize the NACK(s) over a time period X, starting from the end of the initial delivery session;
else
    wait until after a certain time Y after the initial session ends, and then randomize the NACK(s) over a time period Z The values of W, X, Y, and Z can be fixed and chosen according to the number of participants (number of receivers) in the session. A look-up table, such as the sample one show below, can be stored on the sender device 10 and a look-up into the proper table entry can be used to choose the threshold values.

| # of receivers | W (%) | X (sec) | Y (sec) | Z (sec) |
| --- | --- | --- | --- | --- |
| 100 | 5 | 5 | 25 | 10 |
| 200 | 5 | 10 | 30 | 20 |
| 500 | 5 | 15 | 35 | 30 |
| 1000 | 5 | 20 | 40 | 40 |
| 5000 | 5 | 30 | 50 | 60 |
| 10000 | 5 | 60 | 80 | 120 |
| 50000 | 5 | 200 | 250 | 400 |
| 100000 | 5 | 400 | 450 | 800 |
| 500000 | 5 | 2000 | 2100 | 4000 |
| 1000000 | 5 | 4000 | 4200 | 8000 |

It should be noted that the above table is merely one sample. Other values and table structures can be used without departing from the spirit and scope of the invention.

The four values (or in general the values for randomizing the starting time of the repair session) can be communicated from the sender to the receivers via SDP or any other suitable means. The values can be communicated to the receivers anytime between service announcement and the session start time or the latest join time. For example, if a session is announced now via SDP, and scheduled to start after two hours (or alternatively the latest session joining time after 1.5 hours from the delivery of the service announcement), a second SDP with the randomization parameters can be sent, using a second announcement or token which takes into account the number of receivers 20 that joined the session any time before the start of the session. In this case, the receivers 20 get an indication of the randomization time, which takes into account the real and updated number of receivers that have joined the session. Alternatively, the parameters can be communicated within the FDT of a FLUTE session or only a subset of these values may vary with the number of receivers.

Figure 2A:
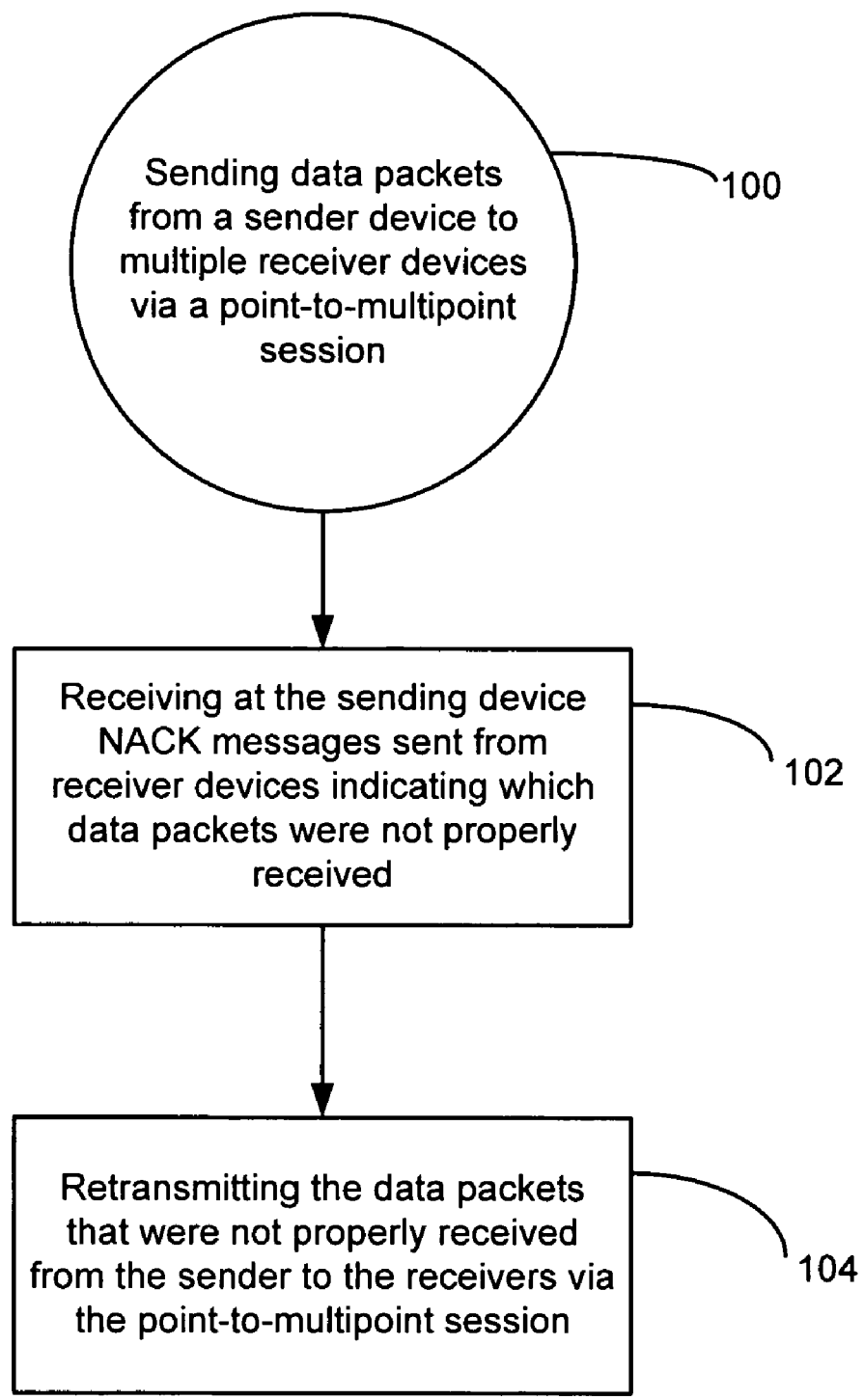
FIG. 2A is a flow chart diagram illustrating one embodiment of a method for data repair according to the present invention.

Turning now to FIG. 2A, one embodiment of a method for providing data repair is disclosed. The method disclosed in FIG. 2A comprises sending data packets from the sender to a plurality of receivers via a point-to-multipoint session (100). If the any of the receivers determines that it has not received some expected data it sends a NACK massage back to the sender requesting data packets were not properly received and the sender receives these NACK massages (102). Next the sender retransmits the requested data packets to the receivers via the point-to-multipoint session (104).

Figure 2B:
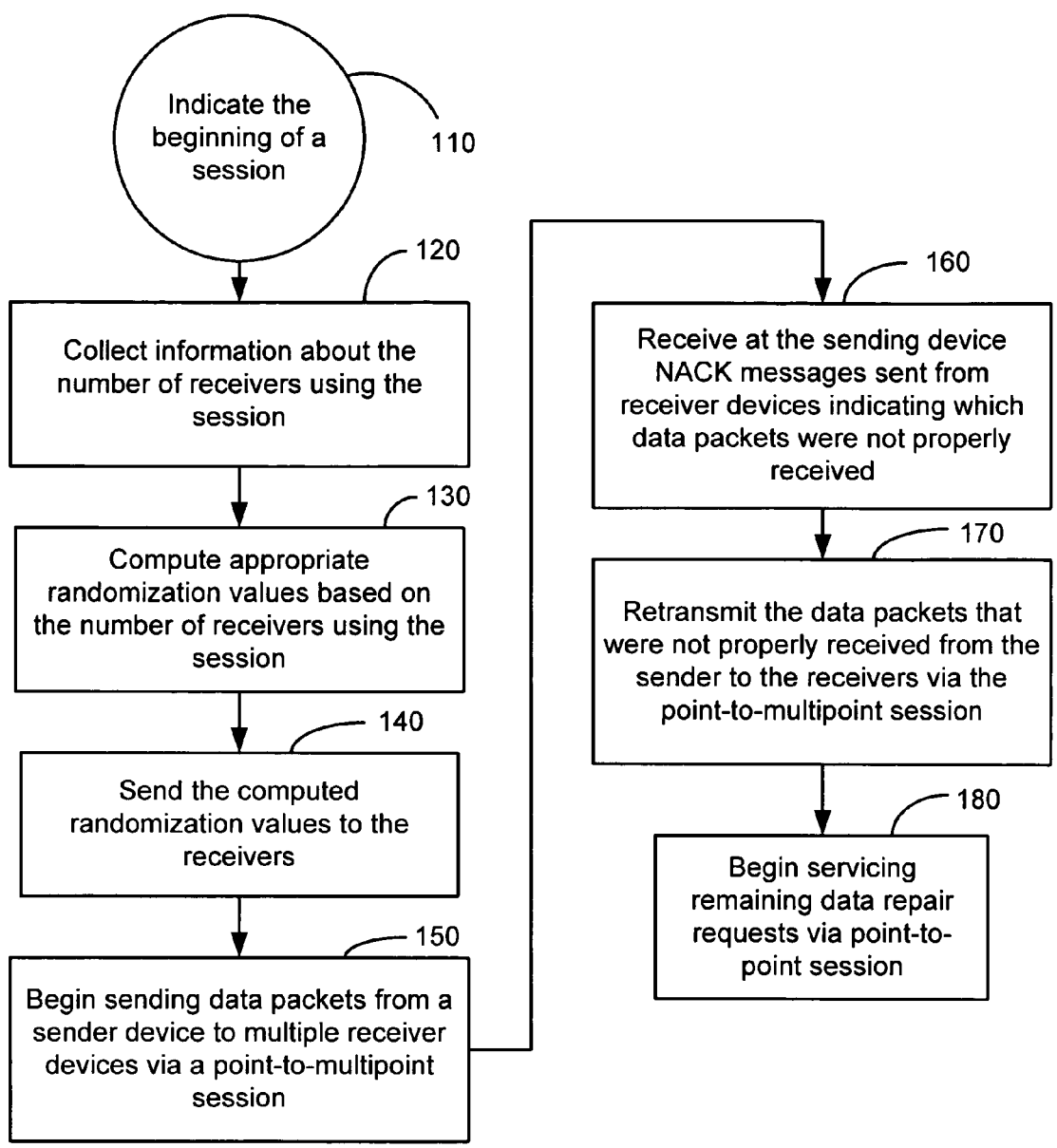
FIG. 2B is a flow chart diagram illustrating another embodiment of a method for data repair according to the present invention.

Another embodiment of the invention is shown in FIG. 2B. In this embodiment, the sender indicates the beginning of a point-to-multipoint session (110) and then collects information about the number of receivers using the session (120). The sender then computes randomization values based on the number of receivers using the session (130) and sends the randomization values to the receivers (140). Next, the sender begins sending data packets to the receivers via the point-to-multipoint session (150). If any of the receivers does not receive all of the expected data packets, it sends a NACK message back to the sender requesting retransmission of the missed data packets. The sender receives these NACK messages (160) and retransmits the requested data packets on the point-to-multipoint session. Then, the server begins servicing any remaining data repair requests via point-to-point session (180). The point-to-point sessions are randomized over a period of time based on the randomization values computed by the sender based on the number of receivers using the point-to-multipoint session.

The data repair methods described herein provide distinct advantages when compared to prior art methods. For example, sending a repair block that a receiver 20 requests via ptp repair via ptm instead of via downlink ptp unloads the ptp channel and helps other receivers 20 that may need the same repair block. Also, scaling the randomization values according to the number of receivers helps avoid the risk of feedback implosion while still minimizing the delay necessary to send requests.

Figure 3:
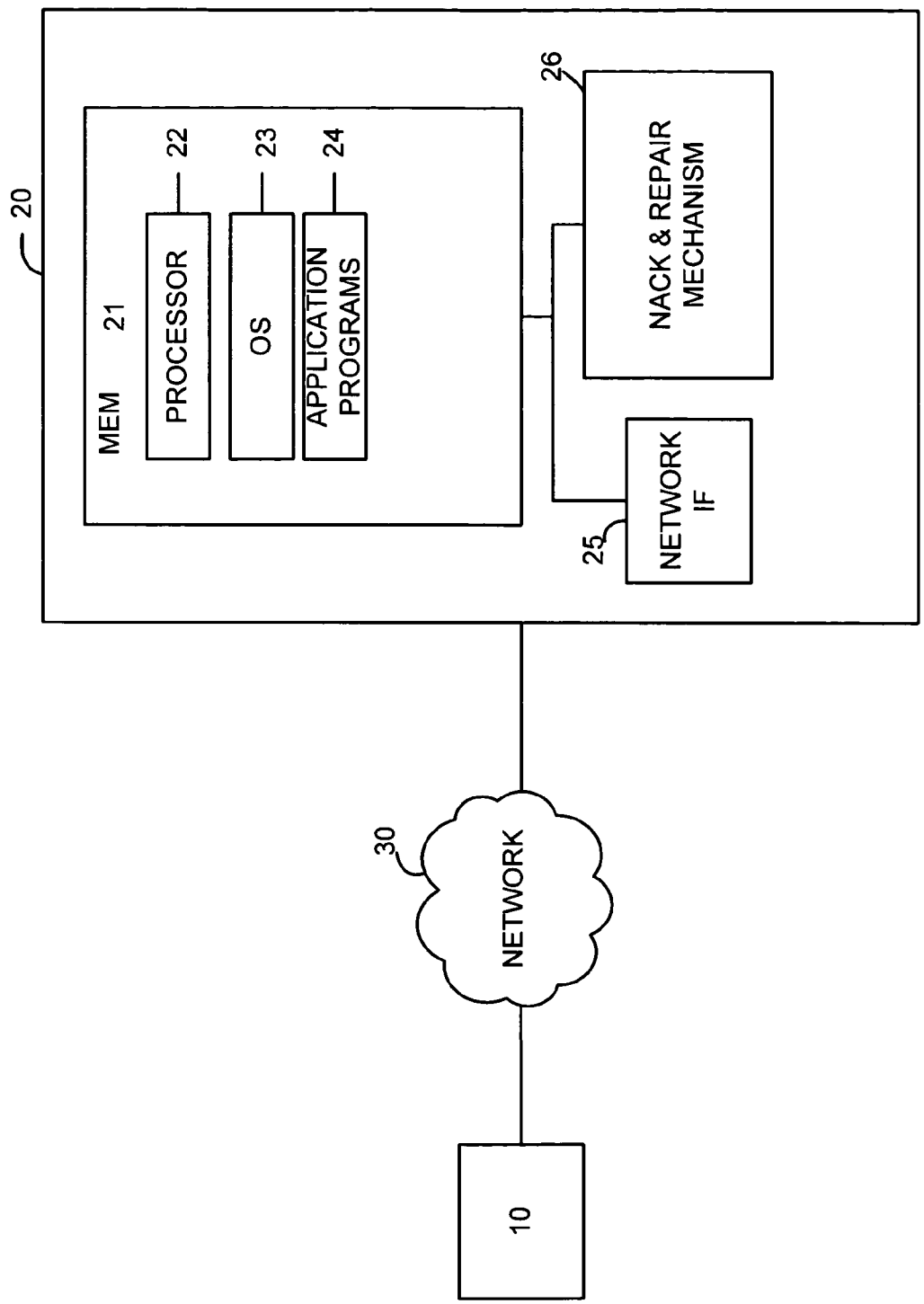
FIG. 3 is a block diagram of a system and receiver device in accordance with one embodiment of the invention.

FIG. 3 illustrates one embodiment of a system 5 and receiver device 20 in accordance with the present invention. The system 5 can include a sender device 10, a transmission network 30, e.g., an IP network or another fixed network, a wireless network or a combination of a fixed and wireless (cellular) network, etc., and the receiver device 20. The receiver device 20 can be, for example, a cellular telephone, a satellite telephone, a personal digital assistant, a Bluetooth device, a WLAN device, a DVB device, or other similar wireless device. The receiver 20 can include an internal memory 21, a processor 22, an operating system 23, application programs 24, a network interface 25, and a NACK and repair mechanism 26. The internal memory 21 may be configured to accommodate the processor 22, operating system 23 and application programs 24. The NACK and repair mechanism 26 can enable the NACKing and repair procedures in response to missing or mangled data in a data transmission. The receiver device 20 can be capable of communication with the sender device 10 and with other devices via the network interface 25 and the network 30.

Figure 4:
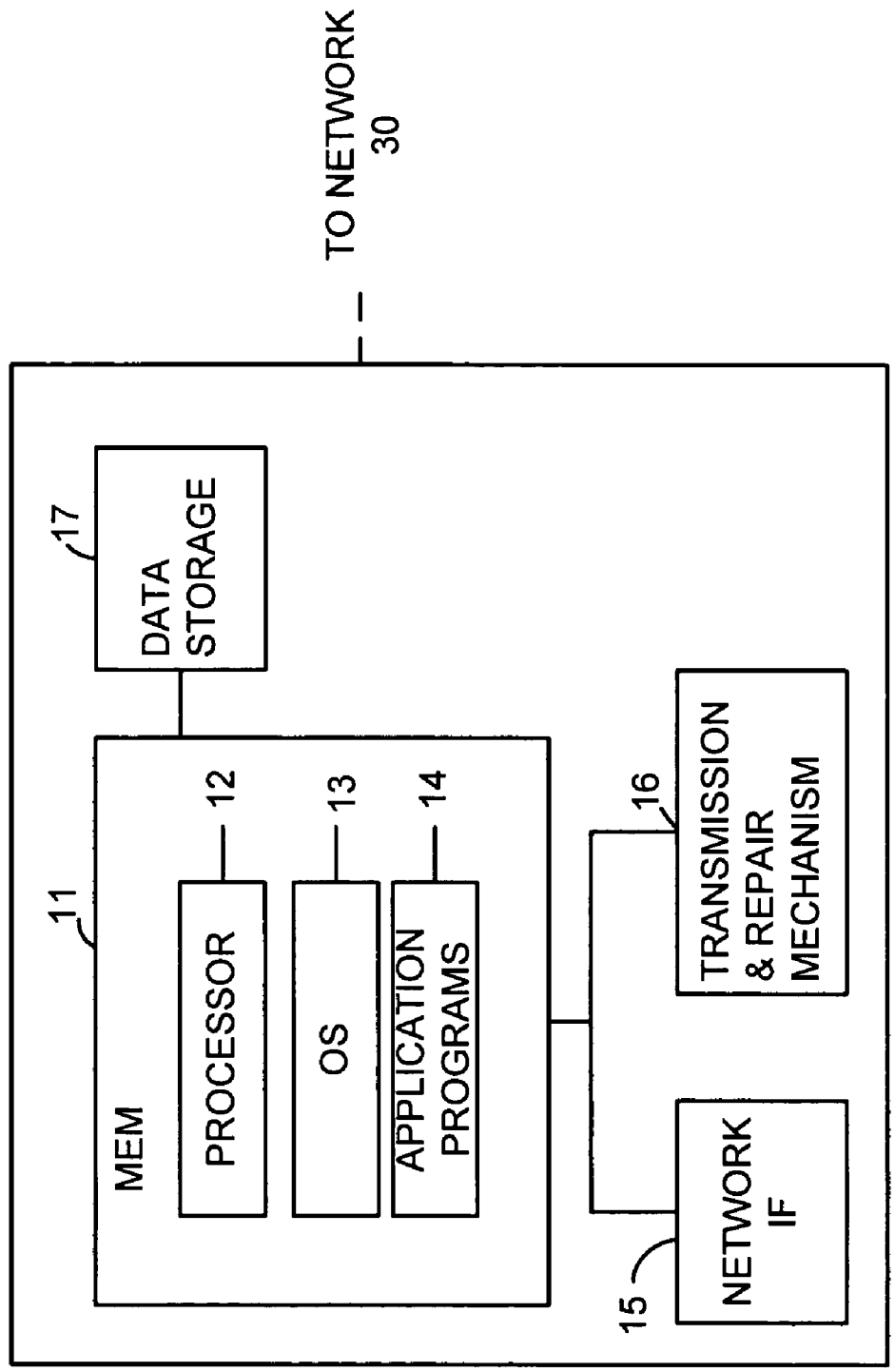
FIG. 4 is a block diagram illustrating a sender device in accordance with one embodiment of the invention.

FIG. 4 illustrates one embodiment of a sender device 10 in accordance with the present invention. The sender device 10 can be, for example, a network server or any suitable device intended for file (or media) delivery. The sender device 10 can include internal memory 11, a processor 12, an operating system 13, application programs 14, a network interface 15, a transmission and repair mechanism 16, and a data storage 17. The internal memory 11 can be configured to accommodate the processor 12, operating system 13, and application programs 14. The transmission and repair mechanism 16 can be configured to enable the transmission of data packets to receiver devices 20. Furthermore, it can be setup to enable re-transmission of data packets in repair sessions. Data to be sent to receiver devices 20 and data to be re-transmitted can be stored in the data storage 17. Alternatively, data can be stored in a separate device co-located with or outside of the sender device 10. The sender device 10 can be configured to communicate with the receiver device 20 and other devices via the network interface 15 and the network 30.

Procedures relating to repair of missing data can be implemented by software. A computer program product comprising program code stored in the receiver device 20 and run in the processor 22 can be used to implement the procedures at the receiving end of the transmission session, whereas a computer program product comprising program code stored in the sender device 10 and run in the processor 12 can be used to implement the procedures at the transmitting end.

Embodiments of the invention have been illustrated with examples or logical sender/server entitles and receiver units, however, the use of other entities going between for repair requests, and repair responses (if appropriate), are also contemplated and considered within the scope of the subject invention. Such an entity may provide firewall, proxy, and/or authorization services.

While the exemplary embodiments illustrated in the FIGURES and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

What is claimed is:

1. A method for data repair in a point-to-multipoint communications system, the method comprising:
   transmitting data from a sender to a plurality of receivers via a point-to-multipoint session;
   determining if any expected data was not received;
   if some expected data was not received, sending a data repair request to the sender requesting that the expected-but-not-received data be resent;
   retransmitting from the sender all of the requested expected-but-not-received data via the point-to-multipoint session;
   after the sender retransmits the requested expected-but-not-received data, if some data was still not received, scheduling point-to-point repair sessions for specific receivers that expected data that was not received; and
   sending data still not received to the specific receivers via point-to-point sessions according to the point-to-point repair session schedule.

2. The method of claim 1, wherein scheduling point-to-point repair sessions further comprises specifying a randomization mechanism to randomize point-to-point data repair over a certain time period after the sender has retransmitted the requested expected-but-not-received data.

3. The method of claim 2, wherein the randomization mechanism is configured to take into account the number of receivers included in the plurality of receivers.

4. The method of claim 3, further comprising:
determining the number of receivers in the plurality of receivers; and
computing the randomization values for the randomization mechanism based on the determined number of receivers.

5. The method of claim 4, wherein computing the randomization values further comprises looking up the randomization values up in a look-up table based on the determined number of receivers.

6. The method of claim 1, wherein scheduling point-to-point repair sessions further comprises:
if point-to-multipoint repair is possible for a receiver, then uniformly randomizing data repair requests over a time period X staffing from the end of the initial transmitting of data from the sender to the receivers via the point-to-multipoint session;
else
waiting until a certain time Y after the initial transmitting of data from the sender to the receivers via the point-to-multipoint session and then randomizing the data repair requests over a time period Z.

7. The method of claim 1, wherein scheduling point-to-point repair sessions comprises sending a point-to-point repair token from the sender to the plurality of receivers to announce when point-to-point repair will begin.

8. A point-to-multipoint communication system for repairing data, the system comprising:
a sender device for transmitting data via point-to-multipoint communications;
a plurality of receivers for receiving data from the sender device;
wherein the sender device is configured to transmit data to the plurality of receivers via a point-to-multipoint session;
the plurality of receivers are configured to receive data transmitted by the sender device, determine if any expected data was not received, and, if so, send a data repair request back to the sender device requesting that the expected-but-not-received data be resent; and
the sender device is configured to receive data repair requests from the plurality of receivers and to retransmit all of the requested expected-but-not-received data via the point-to-multipoint session;
wherein the sender device is further configured to schedule point-to-point data repair sessions with the plurality of receivers after retransmission of the requested expected-but-not-received data and the sender is configured to send expected-but-not-received data to the plurality of receivers via point-to-point sessions.

9. The system of claim 8 wherein the sender device is further configured to specify a randomization mechanism to delay point-to-point data repair.

10. The system of claim 9 wherein the sender is capable of determining the number of receivers on the point-to-multipoint session and is capable of computing a randomization mechanism that is based on the determined number of receivers.

11. The system of claim 8 wherein the sender is configured to send a point-to-point repair token to the plurality of receives to announce when point-to-point repair will begin.

12. The system of claim 8 further comprising a look-up table for determining the point-to-point repair schedule.

13. A computer code product embodied on a computer readable storage medium, the computer code product comprising: computer code that, when executed by a processor, causes a computer to perform the following:
transmit data from a sender to a plurality of receivers via a point-to-multipoint session;
determine if expected data was not received at any of the plurality of receivers;
make a data repair request if any expected data was not received at any of the plurality of receivers; and
retransmit all of the requested expected-but-not-received data to the plurality of receivers via the point-to-multipoint session;
wherein the computer code is further configured to schedule point-to-point data repair sessions after retransmission of the requested expected-but-not-received data.

14. A computer code product embodied on a computer storage readable medium, the computer code product comprising: computer code that, when executed, causes a computer to perform the following:
transmit data from a sender to a plurality of receivers via a point-to-multipoint session;
determine if expected data was not received at any of the plurality of receivers;
make a data repair request if any expected data was not received at any of the plurality of receivers; and
retransmit all of the requested expected-but-not-received data to the plurality of receivers via the point-to-multipoint session;
wherein the computer code is further configured to determine the number of receivers on the point-to-multipoint session and schedule the point-to-point data repair sessions based on the determined number of receivers.

15. A sender device for use in a point-to-multipoint communication system, the sender device comprising:
means for transmitting data to a plurality of receivers via a point-to-multipoint session;
means for receiving data repair requests from the plurality of receivers requesting expected-but-not-received data;
means for retransmitting all of the requested expected-but-not-received data via a point-to-multipoint session; and
means for scheduling point-to-point data repair sessions with the plurality of receivers after retransmitting the requested expected-but-not-received data.

16. A sender device for use in a point-to-multipoint communication system, the sender device comprising:
means for transmitting data to a plurality of receivers via a point-to-multipoint session;
means for receiving data repair requests from the plurality of receivers requesting expected-but-not-received data;
means for retransmitting all of the requested expected-but-not-received data via a point-to-multipoint session;
wherein the sender device farther comprises means for determining the number of receivers using the point-to-multipoint session wherein the sender is configured to schedule the point-to-point data repair sessions based on the determined number of receivers.

17. A method for data repair in a point-to-multipoint communication system, the method comprising:
transmitting data from a sender to a plurality of receivers via a point-to-multipoint session;
determining if any of the plurality of receivers expected data that was not received;
determining the number of receivers using the point-to-multipoint session;
computing randomization values for a randomization mechanism based on the determined number of receivers;
scheduling point-to-point repair sessions with any of the plurality of receivers that expected data that was not received; and delaying the point-to-point data repair sessions based on the computed randomization values.

18. A computer code product embodied on a computer readable storage medium, the computer code product comprising: computer code that, when executed, causes a computer to perform the following:
   transmit data from a sender to a plurality of receivers via a point-to-multipoint session;
   determine if expected data was not received at any of the plurality of receivers;
   make a data repair request if any data was not received at any of the plurality of receivers;
   determine the number of receivers on the point-to-multipoint session;
   schedule point-to-point data repair sessions for each receiver that did not receive all expected data; and
   delaying the point-to-point data repair session based on the number of determined receivers.

19. A sender device for use in a point-to-multipoint communication system, the sender device comprising:
   means for transmitting data to a plurality of receivers via a point-to-multipoint session;
   means for receiving data repair requests from the plurality of receivers requesting expected-but-not-received data;
   means for determining the number of receivers using the point-to-multipoint session;
   wherein the sender device is configured to schedule point-to-point data repair sessions with receivers that did not receive all expected data; and
   delaying the point-to-point data repair session based on the determined number of receivers.

20. A point-to-multipoint communication system for repairing data, the system comprising:
   a sender device for transmitting data via point-to-multipoint communications;
   a plurality of receivers for receiving data from the sender device;
   wherein the sender is configured to transmit data to the plurality of receivers via a point-to-multipoint session;
   the plurality of receivers being configured to receive data transmitted by the sender device, determine if any expected data was not received, and if so, send a data repair request back to the sender device requesting that the expected-but-not-received data be resent;
   the sender being configured to determine the number of receivers on the point-to-multipoint session and to determine a randomization mechanism based on the determined number of receivers;
   the sender being configured to schedule point-to-point repair sessions with receivers that expected data that was not received, the point-to-point repair sessions being delayed based on the randomization mechanism.

* * * * *